(12) United States Patent
Ishiwata

(10) Patent No.: US 6,523,863 B2
(45) Date of Patent: Feb. 25, 2003

(54) COUPLING FOR FLUID PIPES (75) Inventor: Kazutami Ishiwata, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 09/927,667

(22) Filed: Aug. 10, 2001

(65) Prior Publication Data

US 2002/0020450 A1 Feb. 21, 2002

(30) Foreign Application Priority Data

Aug. 10, 2000 (JP) ........................................ 2000-242895

(51) Int. Cl.$^7$ ................................................ F16L 37/34
(52) U.S. Cl. ....................... 285/316; 285/336; 285/918; 137/614.03; 137/614.06; 277/603; 277/626
(58) Field of Search ................................ 285/379, 316, 285/918, 336; 137/212, 614.03, 614.04, 614.06, 614.01, 614.02, 614.05; 222/105; 220/304, 400.7; 277/603, 626, 566

(56) References Cited

U.S. PATENT DOCUMENTS

| | | | | |
|---|---|---|---|---|
| 2,906,552 A | * | 9/1959 | White | 139/408 |
| 3,196,897 A | * | 7/1965 | Hodson | 285/316 |
| 3,527,480 A | * | 9/1970 | Larson | 285/316 |
| 5,108,015 A | * | 4/1992 | Rauworth et al. | 137/212 |
| 5,139,288 A | * | 8/1992 | Najm et al. | 285/368 |
| 5,238,136 A | * | 8/1993 | Kasugai et al. | 220/304 |
| 5,340,161 A | * | 8/1994 | Bagnulo | 285/368 |
| 5,462,316 A | * | 10/1995 | Street et al. | 285/316 |
| 5,490,680 A | * | 2/1996 | Patel et al. | 285/379 |
| 5,636,769 A | * | 6/1997 | Willingham | 222/400.7 |
| 5,709,243 A | | 1/1998 | Wells et al. | |
| 5,810,048 A | * | 9/1998 | Zeiner-Gundersen | 137/614.04 |
| 5,957,328 A | * | 9/1999 | Osgar | 222/105 |
| 5,971,019 A | * | 10/1999 | Imai | 137/614.04 |
| 5,984,266 A | * | 11/1999 | Kotake | 285/316 |
| 6,123,104 A | * | 9/2000 | Smith, III | 137/614.04 |

FOREIGN PATENT DOCUMENTS

| | | | |
|---|---|---|---|
| DE | 3406211 | * | 8/1985 |
| JP | 2761354 | | 3/1998 |
| JP | 11-193894 | | 7/1999 |

\* cited by examiner

*Primary Examiner*—Eric K. Nicholson
(74) *Attorney, Agent, or Firm*—Pennie & Edmonds LLP (57) ABSTRACT

Provided is a coupling for fluid pipes, comprising a plug and a socket. The socket includes a socket body, a sleeve slidably fitted on the outer peripheral surface of the socket body and urged toward the distal end thereof, and a plurality of locking members provided on the socket body and capable of being engaged with and disengaged from an outer peripheral groove by means of the sleeve. The pipe coupling further comprises a pair of end faces provided individually on the plug and the socket and adapted to abut against each other when the plug and the socket are joined, and a shaped packing provided on one of the coupling end faces and adapted to prevent admission of external air when the coupling end faces abut against each other and to prevent the fluid from leaking out when the coupling end faces are separated from each other.

15 Claims, 7 Drawing Sheets

COUPLING FOR FLUID PIPES

CROSS-REFERENCE TO RELATED APPLICATIONS

This application is based upon and claims the benefit of priority from the prior Japanese Patent Application No. 2000-242895, filed Aug. 10, 2000, the entire contents of which are incorporated herein by reference.

BACKGROUND OF THE INVENTION

1. Field of the Invention

The present invention relates to a coupling for fluid pipes, and more specifically, to a pipe coupling suitable for use with a vessel containing a chemical agent or the like that is used in the field of semiconductor manufacture, for example.

2. Description of the Related Art

Pipe couplings that are composed of a plug and a socket each are used in various chemical lines and ultrapure water lines in the fields of the semiconductor industry, bio-industry, and chemical-medical industry.

With the development of highly integrated semiconductor wafers in semiconductor manufacturing processes, which is involved in the rapid progress of the LSI or super LSI technology, in particular, the pipe couplings of this type are used in lines for various liquids, such as chemicals, and various treatment gases.

Normally, chemicals are received in vessels, which are utilized for the storage and transportation of the chemicals. In using a chemical agent in a vessel, the chemical agent is fed to the supply side in a manner such that a socket paired with a plug on the vessel is connected to and disconnected from the plug. Various vessels and pipe couplings used therein are proposed in Jpn. Pat. Publication No. 2761354 and Jpn. Pat. Appln. KOKAI Publication No. 11-193894.

In the pipe coupling described in Jpn. Pat. Publication No. 2761354, the distal end portion of a valve projects by a large amount from an opening in the distal end portion of a cylindrical main socket body, and a seal member seals a space between the socket and a plug on the outer peripheral surface of the plug.

In the pipe coupling described in Jpn. Pat. Appln. KOKAI Publication No. 11-193894, on the other hand, the distal ends of valves provided on a socket and a plug project from openings in a cylindrical main socket body and a plug body, and a seal member seals a space between the socket and a plug on the outer peripheral surface of the plug.

In both these pipe couplings, however, the distal ends of the valves project from the openings when the socket and the plug are connected, so that the outer peripheral surface of the plug must be sealed by means of an O-ring before the valves are opened. Thus, a space is formed between the opening of the socket and the distal end of the plug. Possibly, therefore, air may get into this space, and a fluid may drip out when the socket and the plug are separated from each other.

Figure 11:
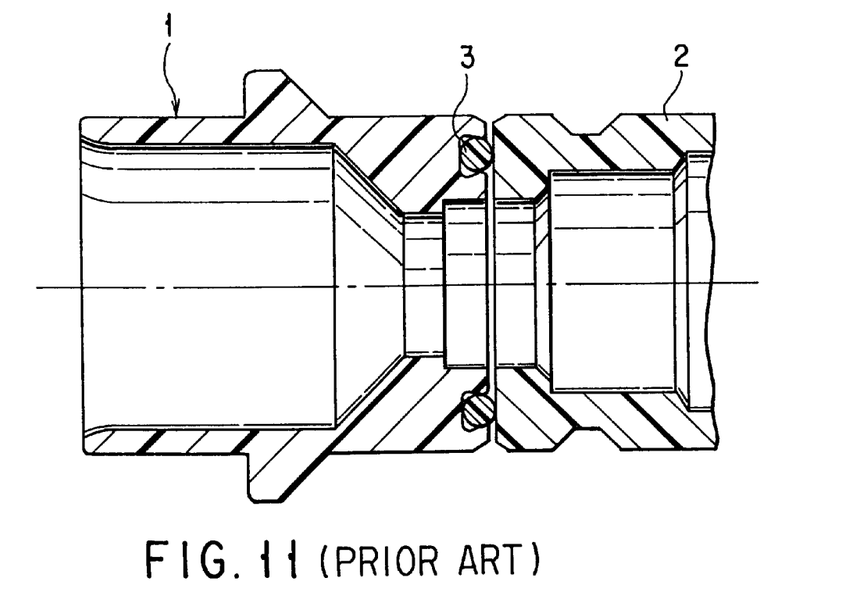
FIG. 11 is a partial sectional view showing a connected state of a conventional pipe coupling.
Figure 12:
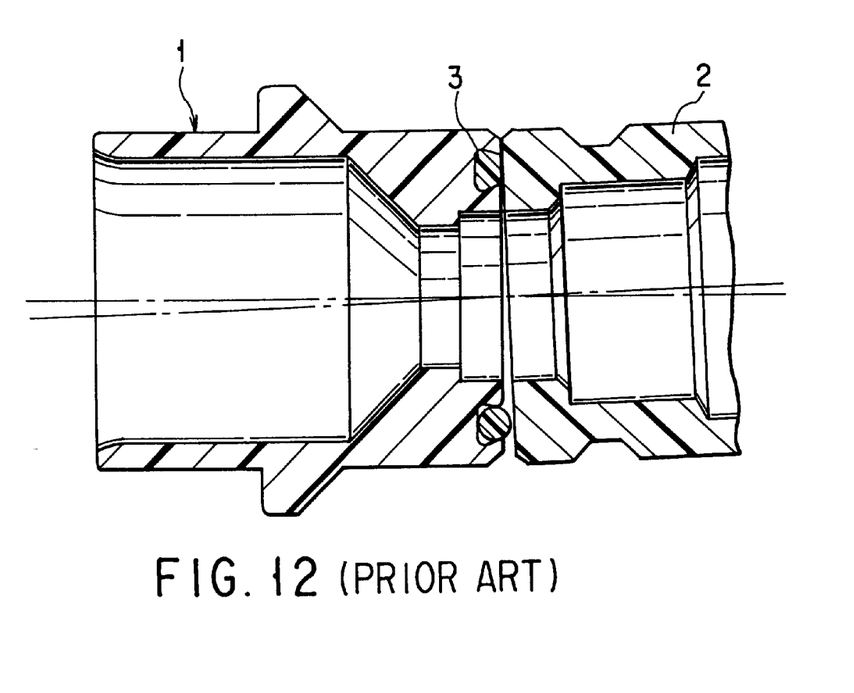
FIG. 12 is a view similar to FIG. 11, showing a bent state of the conventional pipe coupling.

In a pipe coupling shown in FIG. 11, an O-ring 3 is provided on the end face of a socket 1 or a plug 2 without making the distal end of the valve project from an opening. When the socket 1 and the plug 2 are connected to each other, in this case, the O-ring 3 on the socket contacts the end face of the plug along a circular line. FIG. 11 shows a normal state that involves no problem. If bending force acts on the socket 1 and the plug 2, as shown in FIG. 12, however, there is no room for the O-ring 3 to collapse. Thus, the sealing properties become so poor that fluid leakage occurs.

If a spring and other fluid-contacted parts in a pipe coupling are not chemical-resistant, metal is eluted into a fluid, and particles are produced in a semiconductor manufacturing process or the like. These situations must be securely avoided for the semiconductor manufacturing process, in particular.

Further, fluid dripping that is caused as the pipe coupling is disconnected may cause a chemical agent or the like to flow out during the storage or transportation of the vessel, thereby endangering the operation. It is necessary, therefore, that a highly dangerous chemical agent should not leak from the vessel during filling operation.

Furthermore, it is essential securely to prevent wrong connect between a socket and a plug.

BRIEF SUMMARY OF THE INVENTION

The present invention has been contrived in consideration of these circumstances, and its object is to provide a pipe coupling in which inflow of air can be reduced to a very low level when a socket and a plug are connected to each other and a fluid can be prevented from dripping out when the two members are separated from each other.

Another object of the invention is to provide a pipe coupling of which members that touch a fluid have chemical-resistance properties such that production of particles can be reduced.

Still another object of the invention is to provide a pipe coupling capable of securely preventing a fluid from flowing out even in case it drips.

An additional object of the invention is to provide a pipe coupling capable of preventing wrong connection between a socket and a plug.

In order to achieve the above objects, according to the present invention, there is provided a coupling for fluid pipes, comprising a plug having an outer peripheral groove; a socket capable of being connected to the plug, the socket including a socket body, a sleeve slidably fitted on the outer peripheral surface of the socket body and urged toward the distal end thereof, and a plurality of locking members provided on the socket body and capable of being engaged with and disengaged from the outer peripheral groove by means of the sleeve; a pair of end faces provided individually on the plug and the socket and adapted to abut against each other when the plug and the socket are joined; and a shaped packing provided on one of the coupling end faces and adapted to prevent admission of external air when the coupling end faces abut against each other and to prevent the fluid from leaking out when the coupling end faces are separated from each other.

According to this pipe coupling, inflow of air can be reduced to a very low level when the socket and the plug are connected to each other, and the fluid can be prevented from dripping out when the two members are separated from each other. If the pipe coupling is used in a semiconductor manufacturing process, for example, it can prevent the fluid from dripping out and securely prevent fluid leakage during filling operation for filling a harmful chemical agent into a vessel or the like.

Preferably, the shaped packing includes a body having a circular cross section and at least two ring-shaped lips protruding from one side of the body. If bending force acts on the socket and the plug, in this case, one of the lips of the packing can maintain the sealing function, so that leakage can be prevented with improved reliability.

Preferably, the sleeve has, on the rear end side thereof, display portions for preventing wrong connection with the plug. In this case, correct positions can be easily recognized when the sleeve of the socket is connected downward to the plug, so that the connection between the sleeve and the plug is easy. In order to prevent wrong connection, the sleeve or the plug has a projection projecting in the radial direction, and the other of the elements has an axial groove capable of receiving the projection.

In the case where the socket is provided with a grip portion axially extending from the rear end side of the socket body, the grip portion can be formed into an easy-to-grip shape. Therefore, the sleeve can be prevented from being unexpectedly touched as the socket is connected. Thus, wrong connection between the socket and the plug can be prevented, and the efficiency of connection and disconnection of the pipe coupling can be improved.

In the pipe coupling, the plug may be fixed in a cup-shaped plug holder which is capable of being attached to a vessel containing the fluid. The plug holder may includes a thread portion capable of being attached to the vessel and an opening for receiving the socket capable of being fitted with the plug, and a cap may be attached to the opening. Preferably, the cap includes an fixing portion capable of being fixed to the plug holder and a ring-shaped seal portion capable of being engaged with the inner peripheral surface of the opening.

In this case, the plug having its internal valve closed can be fixed in the plug holder, and the opening of the plug holder can be closed by means of the cap. If fluid dripping happens, therefore, the fluid can be prevented from flowing out of the pipe coupling, so that the pipe coupling can be used very safely.

If all of the members capable of touching the fluid are formed of a chemical-resistant material, the pipe coupling can be suitably used in a vessel containing a chemical agent or the like that is used in the field of semiconductor manufacture, for example.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

In the accompanying drawings, numeral 10 denotes a socket, and 11 denotes a plug that is paired with the socket 10 and can be connected to and disconnected from the socket 10. The plug 11 is screwed in a substantially cup-shaped plug holder 12. The socket 10, plug 11, plug holder 12, and other components (fluid-contacted parts) are formed of chemical-resistant materials. Preferred materials include resins such as fluoroplastic, polyethylene, etc.

The rear end portion of a socket body 13 of the socket 10 extends in the axial direction and forms a grip portion 14. In this embodiment, the grip portion 14 is formed by screwing an adapter 15 into the rear end portion of the socket body 13. The rear part of the adapter 15 is tapered forward to facilitate gripping. An end portion of the adapter 15 is provided with an internal thread portion 17, to which a pipe 16 (FIG. 3) for fluid supply to the semiconductor manufacturing premise is connected.

Figure 10:
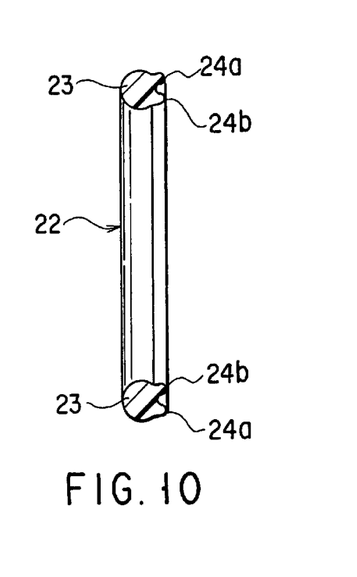
FIG. 10 is a sectional view of a shaped packing attached to the socket.

A slide valve 18 is slidably fitted on the inner surface of the socket body 13. The valve 18 is elastically urged toward the distal end of the socket body 13 by means of a spring 19. The spring 19 is formed of a metallic spring material coated with a chemical-resistant resin. An annular packing 22 is fitted in an annular groove 21 that is formed in a coupling end face 20 on the distal end side of the valve 18. The packing 22 is formed of chemical-resistant rubber or resin and has a noncircular cross section. As shown in FIG. 10, at least two ring-shaped lips 24a and 24b protrude integrally from one side face of a packing body 23 that has a circular cross section. The lips 24a and 24b project from the coupling end face side when the packing 22 is fitted in the groove 21.

The slide valve 18 is slidably fitted on the outer peripheral surface of the distal end portion of the adapter 15 by means of a packing 25 with a Y-shaped cross section for reduced sliding resistance. The inner peripheral surface of the distal end portion of the valve 18 is in engagement with a valve seat 26a of a valve shaft 26 that is fixed to the adapter 15. The rear end portion of the valve shaft 26 is screwed in a holding portion 27 of the adapter 15. The holding portion 27 has a plurality of through holes 28.

Further, a sleeve 30 is slidably fitted on the outer peripheral surface of the socket body 13. The sleeve 30 is elastically urged toward the distal end of the socket body 13 by means of a spring 29. The spring 29 is formed of a metallic spring material coated with a chemical-resistant resin. The sleeve 30 is rotatable with respect to the socket body 13.

One end of the spring 29 is in engagement with an inner stepped portion of a large-diameter portion 30a of the sleeve 30, and the other end with an outwardly projecting stepped portion 13a which is formed on the peripheral surface of the socket body 13. A stop ring 31 is fitted in the rear end portion of the sleeve 30. The ring 31 is designed to engage the stepped portion 13a, thereby preventing the sleeve 30 from slipping off.

Figure 7A:
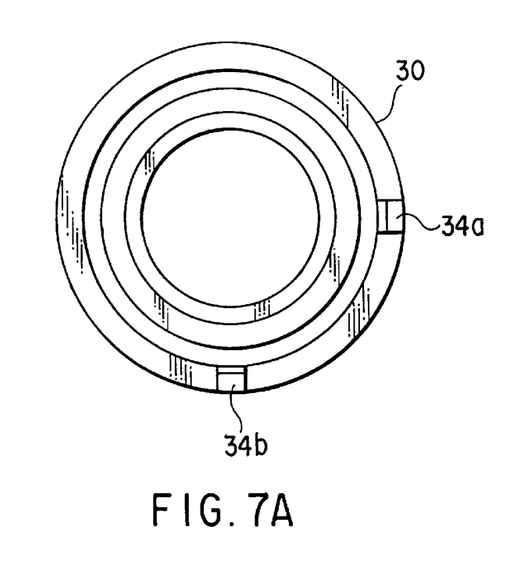
FIGS. 7A and 7B are a plan view and a bottom view, respectively, of a sleeve attached to a socket.
Figure 7B:
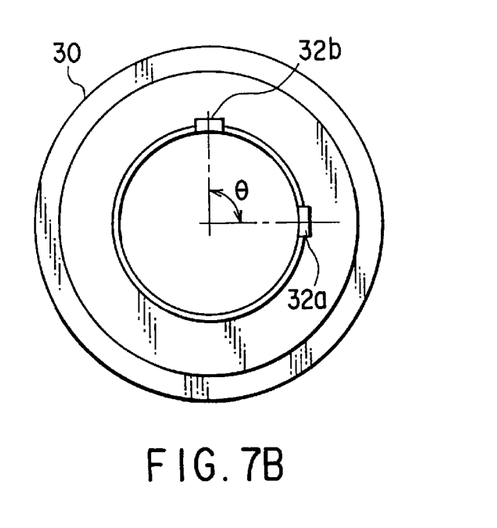

As shown in FIGS. 7A and 7B, key grooves 32a and 32b for preventing wrong connection with the plug 11 are formed on the inner peripheral surface of the distal end portion of the sleeve 30. The grooves 32a and 32b are located at a given angle (90° in this embodiment) from each other. Corresponding in angular position to the grooves 32a and 32b, respectively, display portions 34a and 34b are formed on the rear end portion of the sleeve 30. The display portions 34a and 34b facilitates position alignment with projections 33a and 33b that are formed on the plug 11. The plug 11 and the socket 10 cannot be connected to each other if an angle θ between the key grooves 32a and 32b on the socket side is not equal to the angle between the projections 33a and 33b on the plug side. The angle θ is settled depending on the properties of a fluid used.

If necessary, identification portions with discriminable colors or the like may be provided in a suitable position on the socket 10.

On the inner peripheral side of a small-diameter portion 30b of the sleeve 30, moreover, a ball presser portion 35 and a ball relief portion 36 are formed adjacent to each other. The presser portion 35 and the relief portion 36 enable locking balls 37 to project or retract individually through a plurality of taper holes 13b in the socket body 13. The balls 37 are located in the ball relief portion 36 when the socket 10 and the plug 11 are not connected to each other. When the socket and the plug are connected, the balls 37 are engaged with an outer peripheral groove 38 on the outer peripheral surface of the plug 11 by means of the ball presser portion 35. The locking balls 37 may be replaced with locking claws or any other suitable locking members.

Figure 5:
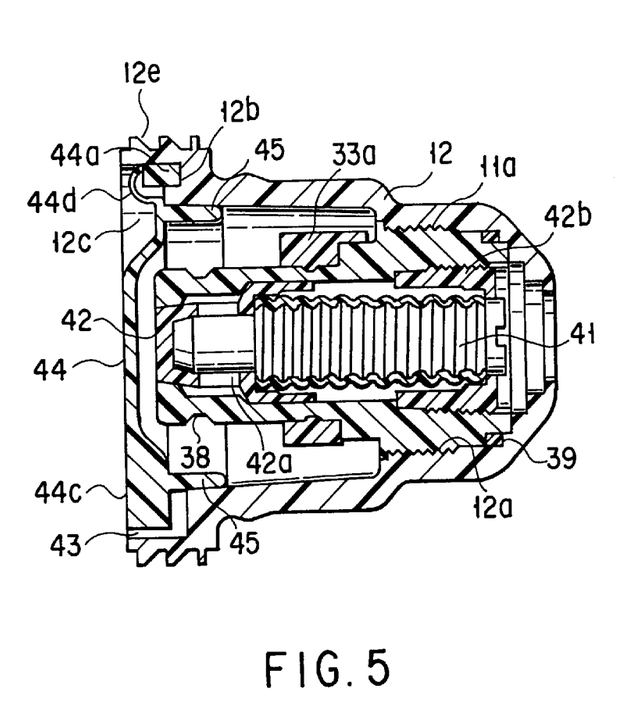
FIG. 5 is a sectional view taken along line A—A of FIG. 4.
Figure 6:
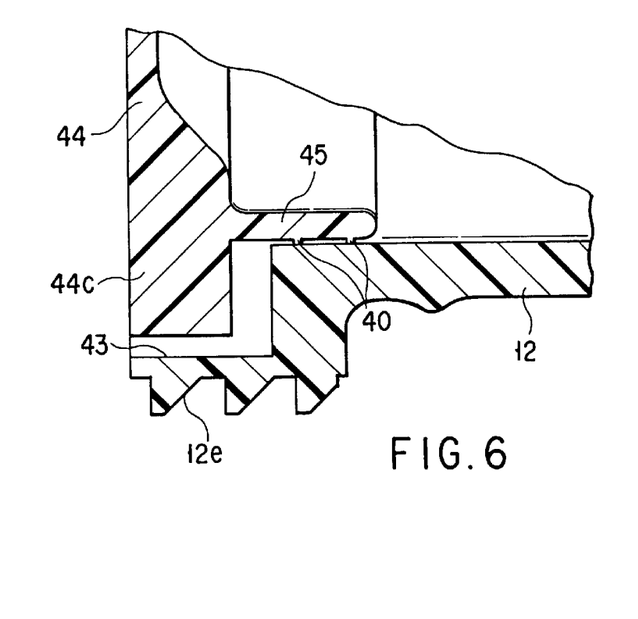
FIG. 6 is an enlarged view showing a part of FIG. 5.
Figure 8:
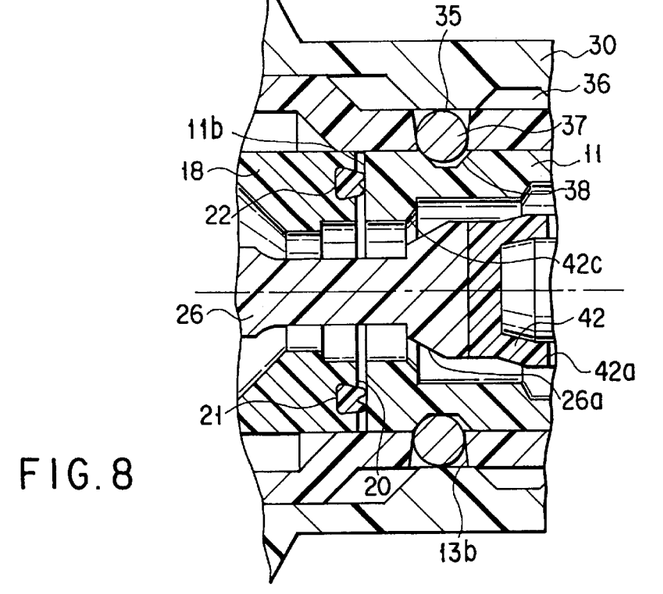
FIG. 8 is an enlarged sectional view showing a normally connected state of the pipe coupling.
Figure 9:
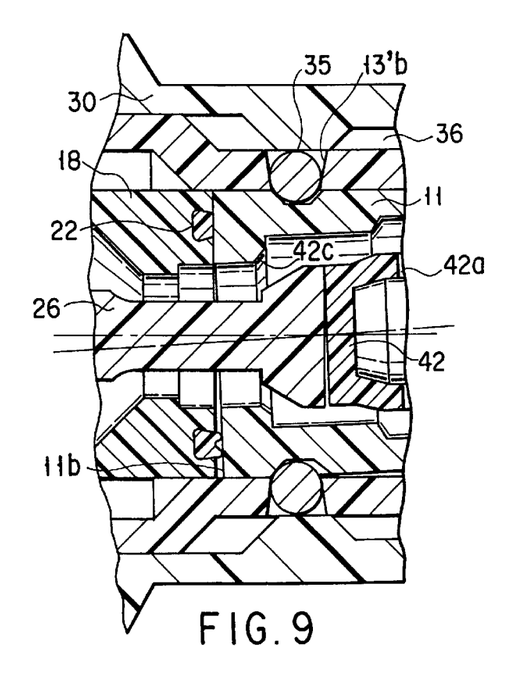
FIG. 9 is a sectional view similar to FIG. 8, showing a bent state of the pipe coupling.

The following is a description of the plug 11. As shown in FIG. 5, an external thread portion 11a on the rear end portion of the plug 11 is screwed in an internal thread portion 12a of the plug holder 12, which is formed of a chemical-resistant resin, such as polyethylene, fluoroplastic, etc. An O-ring 39 is interposed between the plug 11 and the plug holder 12. As shown in FIGS. 8 and 9, a planar end face 11b of the plug 11 serves as an abutting surface for the lips 24a and 24b of the packing 22.

The plug 11 contains therein a valve 42, which is elastically urged to rest against a valve seat 42c (FIG. 8) by means of a bellows-shaped spring 41 of a chemical-resistant resin. The valve 42 has radial through holes 42a. A valve stopper 42b on the rear end portion of the plug 11 stops the valve 42 that is pressed against the urging force of the spring 41.

Jig attachment grooves 43, four in number according to this embodiment, are arranged at an equal interval on the inner periphery of the upper end portion of an opening 12c of the plug holder 12. Further, the upper end of the plug holder 12 is provided with an attachment groove 12b for fixing an attachment portion 44a that is coupled to a disk-shaped cap 44 by means of a connecting piece 44d. Projecting pieces 44b and a knob portion 44c that can be fitted in the attachment grooves 43 are formed on the outer periphery of the cap 44. A ring-shaped seal portion 45, which hangs down from the lower surface of the cap 44, is removably fitted in the opening 12c of the plug holder 12. Furthermore, sealing ridges 40 are formed on the outer peripheral surface of the seal portion 45, whereby the sealing properties of the seal portion 45 in the opening 12c are maintained. A mounting hole 12d for a siphon pipe 46 is formed in the lower part of the plug holder 12. An external thread portion 12e is formed on the outer periphery of the upper part of the holder 12. The external thread portion 12e is screwed in an internal thread portion 47a on the upper wall portion of a vessel 47, that contains a chemical agent or the like, with a packing 47b interposed between the holder 12 and the vessel 47.

The following is a description of operation according to this embodiment.

Figure 3:
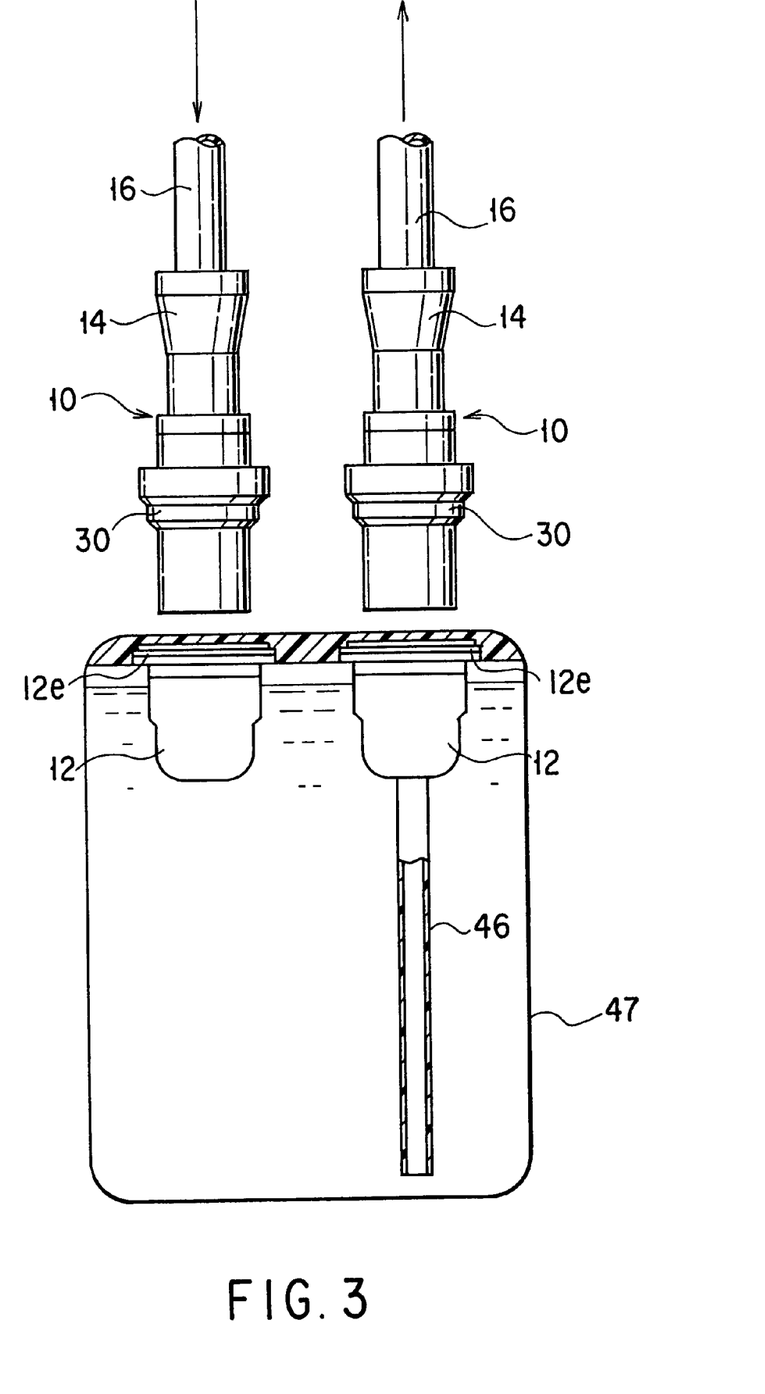
FIG. 3 is a schematic view for illustrating chemical agent feeding operation using the pipe coupling shown in FIG. 1.
Figure 4:
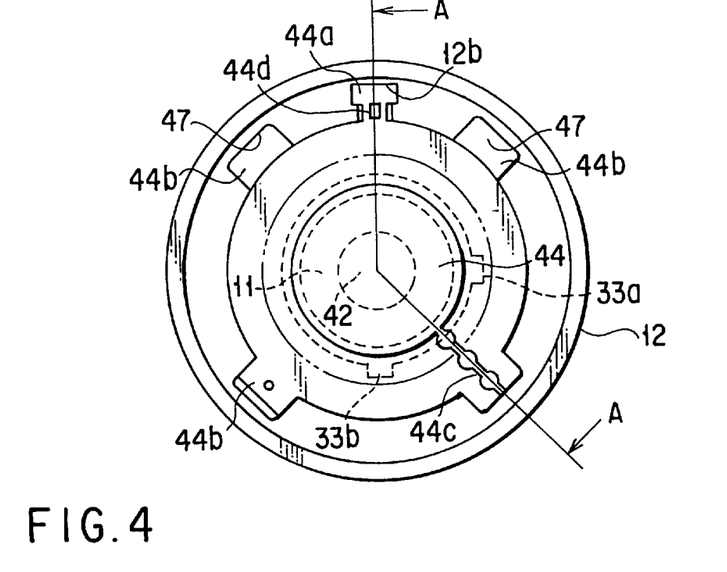
FIG. 4 is a plan view showing a plug holder fitted with a cap.

In mounting the plug holder 12 on the upper wall portion of the vessel 47, a jig (not shown) is attached to the jig attachment grooves 43, and the holder 12 is screwed into the internal thread portion 47a. The leaked fluid never pools in the attachment grooves 43, and the projecting pieces 44b of the cap 44 get into the grooves 43, so that there is no possibility of the fluid flowing out. As shown in FIG. 3, the vessel 47 is provided with two plug holders 12, through which the chemical agent in the vessel 47 can be supplied.

When an operator pinches the knob portion 44c of the cap 44, the cap 44 can be detached from the opening 12c of the plug holder 12. As this is done, the cap 44 cannot be easily disengaged from the plug holder 12, since the attachment portion 44a is fixed to the attachment groove 12b of the holder 12 by means of the connecting piece 44d. In connecting the plug 11 in the plug holder 12 and the socket 10 in this state, the operator first selects the socket 10 corresponding to the plug 11. The operator holds the grip portion 14 of the socket 10, rotates the sleeve 30, thereby aligning the display portions 34a and 34b on the rear end face of the sleeve 30 with the projections 33a and 33b of the plug 11, and inserts the socket 10 into the plug 11. Thereupon, the key grooves 32a and 32b are aligned with the projections 33a and 33b, respectively. If they fail to be aligned, the distal end face of the sleeve 30 abuts against the projections 33a and 33b, so that the socket 10 cannot be inserted into the plug 11. Thus, the plug 11 and the socket 10 can be prevented from being wrongly connected to each other.

Since the grip portion 14 extends so that its rear portion is tapered forward, it can be grasped with ease, and therefore, the socket 10 can be easily connected to the plug 11.

If the socket 10 continues to be inserted after the socket 10 and the plug 11 are aligned as a pair, the distal end face of the plug 11 and the coupling end face 20 of the slide valve 18 of the socket 10 engage each other with the shaped packing 22 between them. The slide valve 18 is pushed into the socket 10 and lifted from the valve seat 26a of the valve shaft 26, resisting the urging force of the spring 19. Further, the valve 42 is pushed into the plug 11 by means of the distal end face of the valve shaft 26, resisting the urging force of the bellows-shaped spring 41, whereupon a passage for the socket 10 and the plug 11 is formed.

Figure 1:
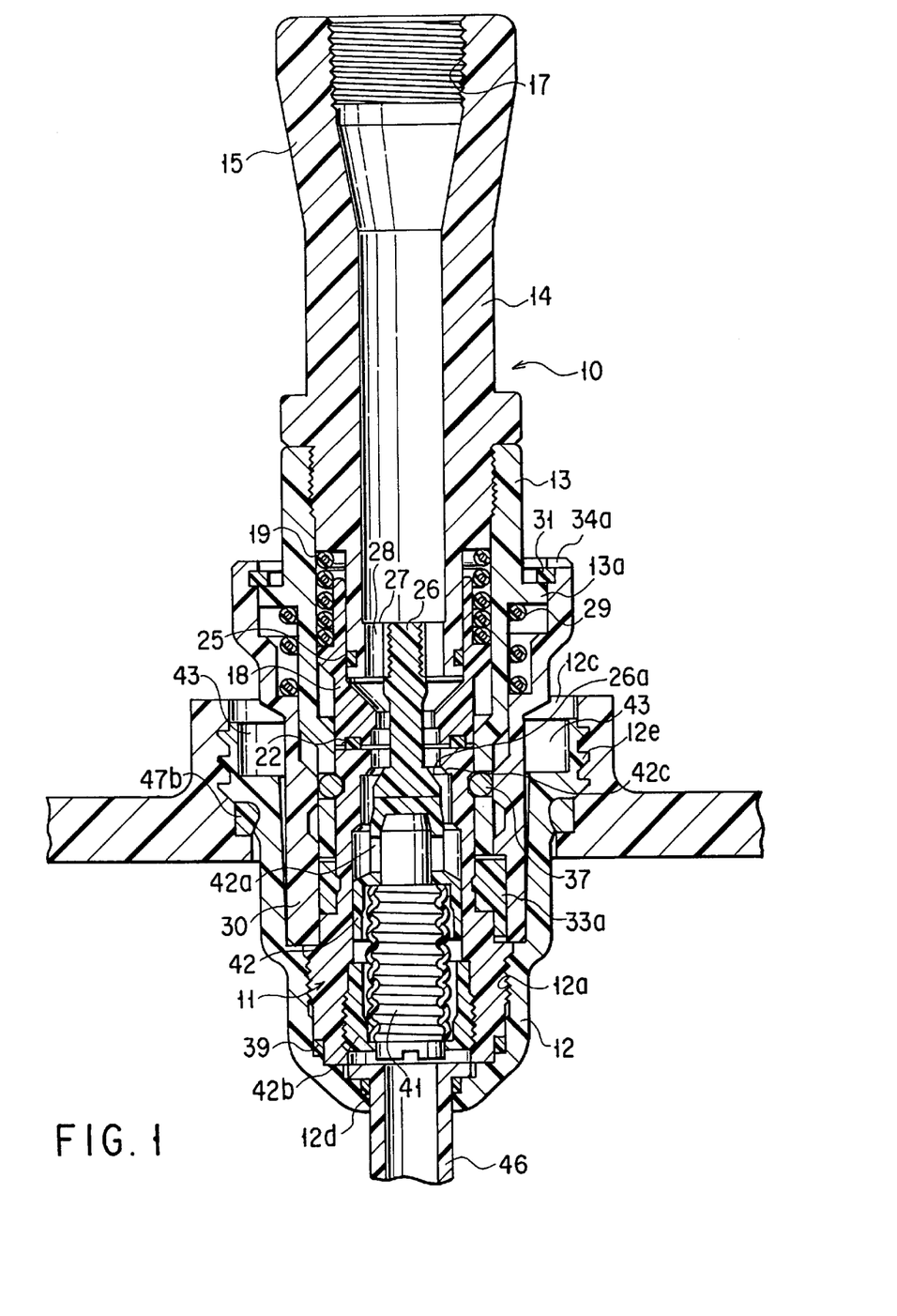
FIG. 1 is a sectional view showing a connected state of a pipe coupling according to an embodiment of the present invention.
Figure 2:
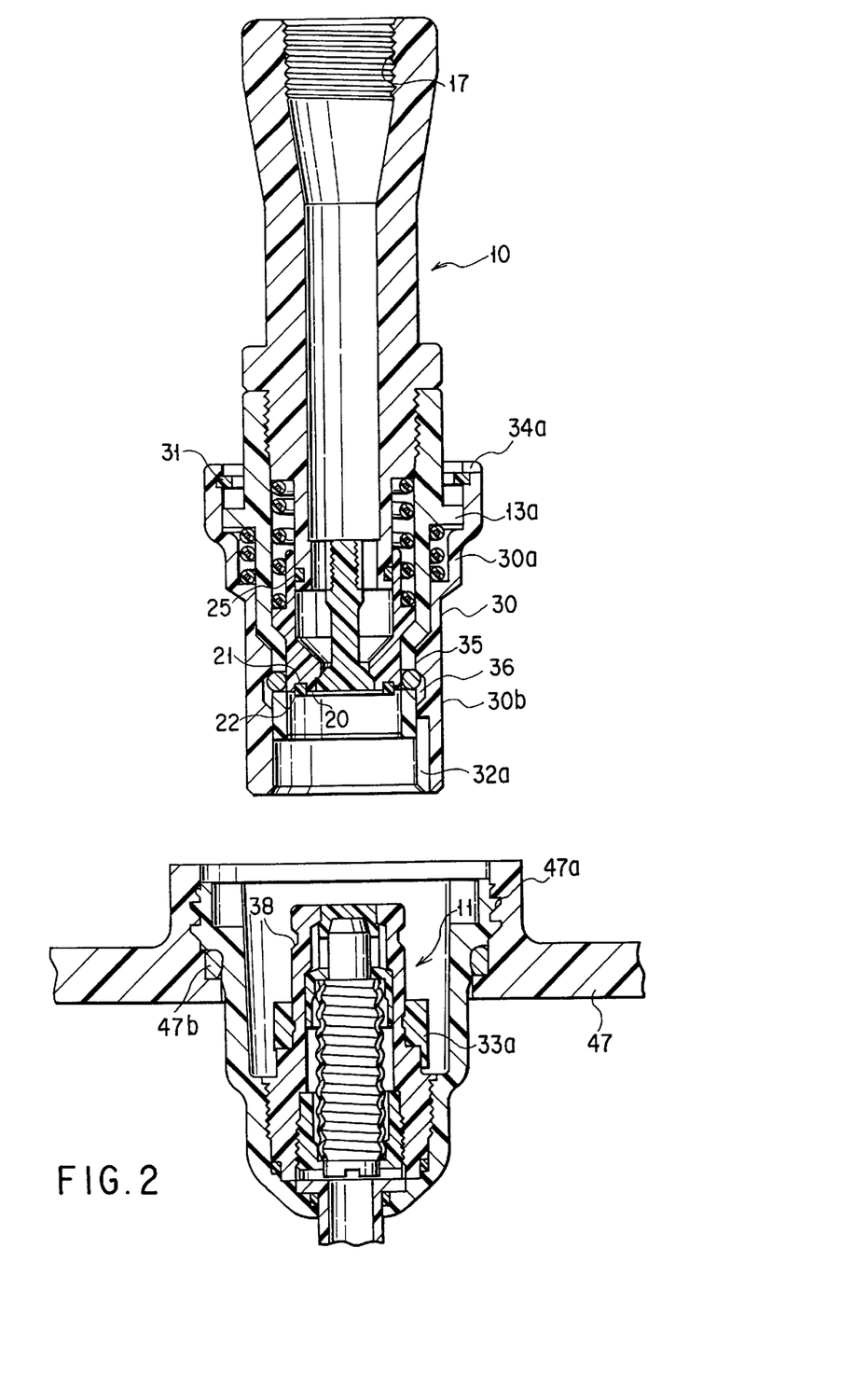
FIG. 2 is a sectional view showing a separate state of the pipe coupling of FIG. 1.

On the other hand, the locking balls 37 in the socket body 13 are allowed to move toward the center of the socket 10 and engage the outer peripheral groove 38 of the plug 11, whereupon the socket 10 and the plug 11 are connected to each other, as shown in FIG. 1.

In a normally connected state, the two lips 24a and 24b of the shaped packing 22 abut against the planar end face 11b of the plug 11 to seal the space between them, as shown in FIG. 8. If any bending forces act on the socket 10 and the plug 11, as shown in FIG. 9, one of the lips 24a and 24b can keep the sealing function, so that leakage can be prevented with improved reliability.

FIG. 3 shows the way in which the chemical agent in the vessel 47 is supplied by means of a vacuum pump to the field of semiconductor manufacture through the pipes 16. The vessel 47 is provided with two plugs, namely a supply plug and a plug for preventing negative pressure in the vessel 47. The socket 10 is connected to each of the plugs.

In separating the socket 10 from the plug 11, the sleeve 30 in the state of FIG. 1 is pulled upward. Thereupon, the locking balls 37 are brought to the level of the ball relief portion 36. If the socket 10 is pulled upward when the balls 37 are allowed to move in the diametrical direction, the balls 37 are disengaged from the outer peripheral groove 38 of the plug 11. At the same time, the slide valve 18 is caused to slide toward the distal end of the socket 10 and rest against the valve seat 26a of the valve shaft 26 by means of the urging force of the spring 19, thereby closing the passage. Further, the valve 42 of the plug 11 is restored to its original position by means of the urging force of the spring 41, thereby closing the passage. If the socket 10 is pulled upward in FIG. 1, furthermore, the coupling end face of the slide valve 18 of the socket 10 and the end face of the plug 11 are separated from each other, whereupon the sealing function of the shaped packing 22 is released.

Thus, the pipe coupling of the invention is a highly valuable coupling to be attached to a chemical agent vessel, in particular, without the possibility of the fluid dripping out when the socket 10 and the plug 11 are separated from each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coupling for fluid pipes, comprising:

a plug having an outer peripheral groove;

a socket capable of being fitted with the plug, the socket including a socket body, a sleeve slidably fitted on the outer peripheral surface of the socket body and urged toward the distal end thereof, and a plurality of locking members provided on the socket body and capable of being engaged with and disengaged from the outer peripheral groove by means of the sleeve;

a pair of end faces respectively provided on the plug and the socket and adapted to abut against each other when the plug and the socket are joined;

a pair of valves respectively provided at the plug and the socket, the valves being opened when the plug and the socket are joined, and being closed when the plug and the socket are separated from each other;

a shaped packing including a main body and at least two lips, the main body having a circular cross section, and being provided on one of the coupling end faces, said at least two lips projecting from the main body and being allowed to be brought into contact with the other of the coupling end faces, at least one of said at least two lips being brought into contact with the other of the coupling end faces before the valves are opened, when the plug and the socket are joined thereby preventing admission of external air, and said at least one of said at least two lips being disengaged from the other of the coupling end faces after the valves are closed when the plug and the socket are separated from each other, thereby preventing the fluid from leaking out.

2. A coupling according to claim 1, wherein said lips are arranged concentrically with each other.

3. A coupling according to claim 1, wherein said one coupling end face has an attachment groove holding the packing body, and the other coupling end face is a flat surface.

4. A coupling according to claim 1, wherein said sleeve has, on the rear end side thereof, display portions for preventing wrong connection with the plug.

5. A coupling according to claim 1, wherein said sleeve or said plug has a projection projecting in the radial direction, and the other of said sleeve or plug has an axial groove capable of receiving the projection.

6. A coupling according to claim 1, wherein said socket includes a grip portion axially extending from the rear end side of the socket body.

7. A coupling according to claim 1, further comprising a cup-shaped plug holder capable of being attached to a vessel containing the fluid, for fixing the plug therein, the plug holder including a thread portion capable of being attached to the vessel and an opening for receiving the socket capable of being fitted with the plug, and a cap capable of being attached to the opening.

8. A coupling according to claim 7, wherein said cap includes an attachment portion capable of being fixed to the plug holder and a ring-shaped seal portion capable of engaging the inner peripheral surface of the opening.

9. A coupling according to claim 7, wherein said plug holder is attached to the upper wall portion of the vessel.

10. A coupling according to claim 1, wherein all of said members capable of touching the fluid are formed of a chemical-resistant material.

11. A coupling according to claim 9, wherein said plug holder is formed of a chemical-resistant material.

12. A coupling according to claim 10, wherein said chemical-resistant material includes fluoroplastic.

13. A coupling according to claim 10, wherein said chemical-resistant material includes polyethylene.

14. A coupling according to claim 11, wherein said chemical-resistant material includes fluoroplastic.

15. A coupling according to claim 11, wherein said chemical-resistant material includes polyethylene.

* * * * *